Aug. 3, 1948.  G. S. PERKINS  2,446,386
RAPPING MECHANISM FOR CONFECTION COATING MACHINES
Filed June 10, 1944  7 Sheets-Sheet 5

INVENTOR.
George S. Perkins
BY Mock & Blum

ATTORNEYS

Aug. 3, 1948.  G. S. PERKINS  2,446,386
RAPPING MECHANISM FOR CONFECTION COATING MACHINES
Filed June 10, 1944  7 Sheets-Sheet 6

INVENTOR.
George S. Perkins
BY Mock & Blum
ATTORNEYS

Aug. 3, 1948.  G. S. PERKINS  2,446,386
RAPPING MECHANISM FOR CONFECTION COATING MACHINES
Filed June 10, 1944  7 Sheets-Sheet 7

INVENTOR.
George S. Perkins
BY Mock & Blum
ATTORNEYS

Patented Aug. 3, 1948

2,446,386

UNITED STATES PATENT OFFICE 2,446,386

RAPPING MECHANISM FOR CONFECTION COATING MACHINES

George Simpson Perkins, Kew Gardens, Long Island, N. Y., assignor to National Equipment Co., New York, N. Y., a copartnership composed of Joseph Greenberg, Herman Greenberg, Samuel Greenberg, and Sidney Greenberg Application June 10, 1944, Serial No. 539,681

4 Claims. (Cl. 91—3)

My invention relates to a new and improved coating machine for use in making candies and other products.

Without restricting the scope of the invention, it relates particularly to the application of chocolate in the form of a coating, on various products.

Some of the principal objects of my invention are to provide a machine which applies a smooth and uniform thickness of chocolate coating to candy products, continuously and automatically; to control the flow of the chocolate or other coating material; to eliminate air bubbles in the chocolate or other coating material; and mechanically to control the thickness of the coating.

Other important objects of my invention will be stated in the annexed description and drawings which disclose a preferred embodiment thereof.

Fig. 9 is a partial bottom plan view of the air delivery nozzle which is shown in Figs. 7 and 8.

Fig. 12 is a detail plan view of the shaking or rapping mechanism which shakes the coated pieces after surplus coating material has been removed by the blast of air, in order to smooth the coatings on the pieces of candy or the like.

Fig. 16 is a front elevation of the means for controlling the inlet of air into the air delivery mechanism.

The invention is described particularly with reference to a machine of the enrober type, which coats pieces of candy with chocolate. However, whenever I specify chocolate as a coating material, the scope of my invention includes all other coating materials, and the coating may be applied to any products.

Figure 1:
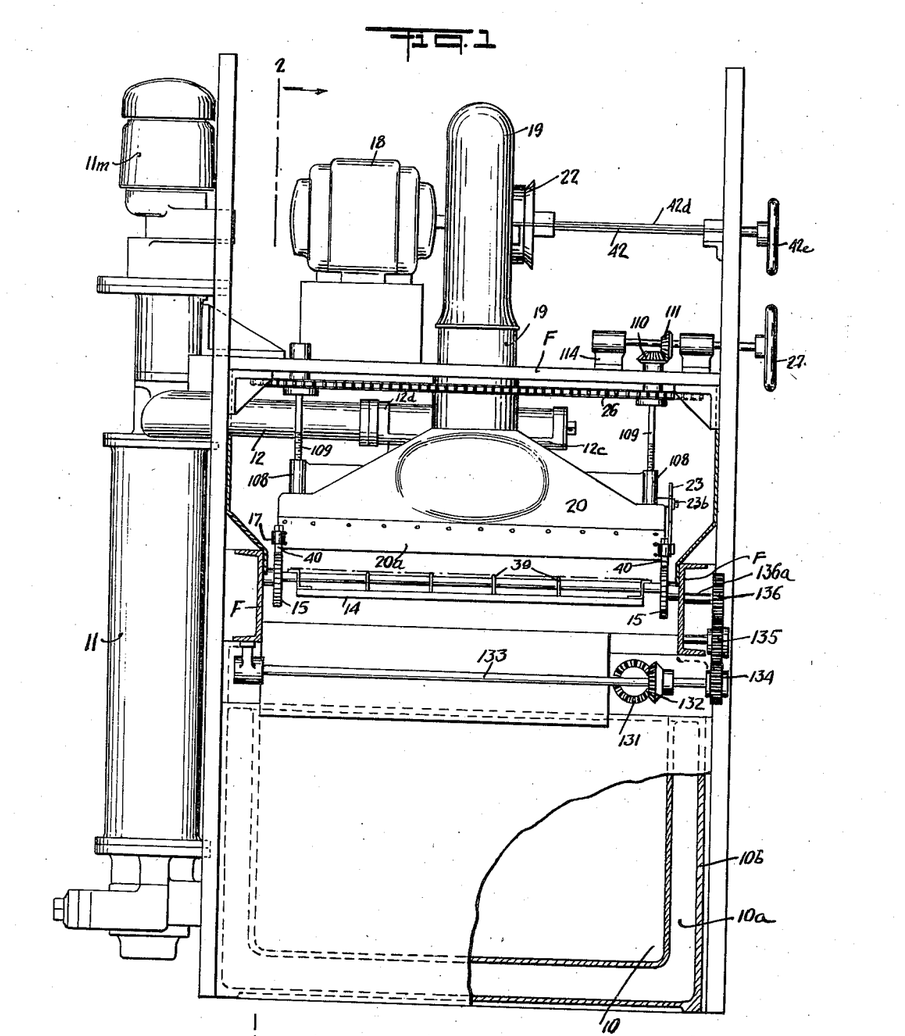
Fig. 1 is a sectional view on the line 1—1 of Fig. 2.

As shown in Fig. 1, for example, the chocolate coating material is maintained in a magazine tank 10. This magazine tank 10 is provided with a water jacket 10a, by means of an outer wall 10b. I have not shown the details for supplying the water jacket 10a with hot water, as such details are conventional. As an example, the chocolate is maintained at a temperature of 90° F.–95° F. in the tank 10. The higher temperature of 95° F. is preferred. This chocolate coating material is liquid and it flows easily, at the temperature at which it is maintained in the tank 10. This chocolate coating material may be suitably compounded according to any well-known formula.

Fig. 1 also shows a pump 11, whose bottom inlet is connected in the usual manner to the tank 10. This pump 11 raises the molten chocolate and its outlet end is connected to the horizontal delivery pipe 12. The pump 11 is operated by a motor 11m.

Figure 4:
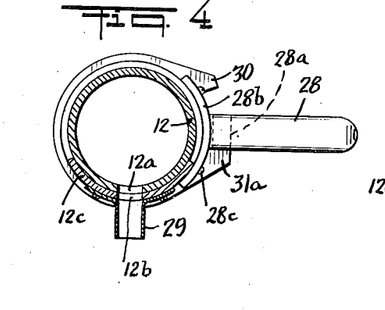
Fig. 4 is a sectional view on the line 4—4 of Fig. 3, showing the parts which control the flow of the covering material, in respective relative positions which permit maximum flow.
Figure 5:
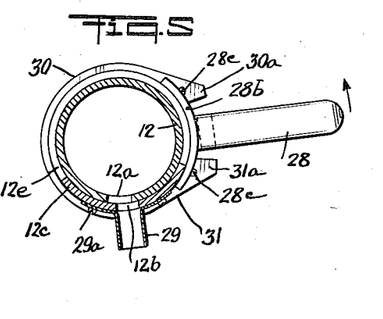
Fig. 5 is similar to Fig. 4, showing the control parts adjusted so as to restrict the flow of the coating material.
Figure 6:
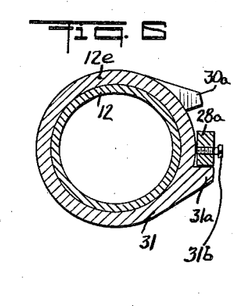
Fig. 6 is a sectional view on the line 6—6 of Fig. 3.

As shown in Figs. 4 and 5, the stationary delivery pipe 12 is provided with a longitudinal outlet port 12a in the bottom thereof. Said outlet port 12a is a slot of uniform width, said slot being parallel to the longitudinal axis of the delivery pipe 12.

The length of the slot or the port 12a is equal to the length of the spout 29. The length of the slot or port 12a is less than the length of pipe 12. Said spout 29 is fixed to a control casing 12c which fits turnably on the delivery pipe 12. Said control casing 12c is provided with an outlet port 12b which is in full registration with the port 12a, when the control casing 12c is in the position shown in Fig. 4. In the position shown in Fig. 5, the port 12b of the control casing 12c registers only partially with the fixed port 12a. In such case, the delivery of the coating material through the spout 29 is less than when the control casing 12c is in the position shown in Fig. 4. The control casing 12c can be turned on the pipe 12, so as to shut off the flow of coating material through the ports 12a and 12b and the spout 29. The ports 12a and 12b are of equal length and width.

Figure 3:
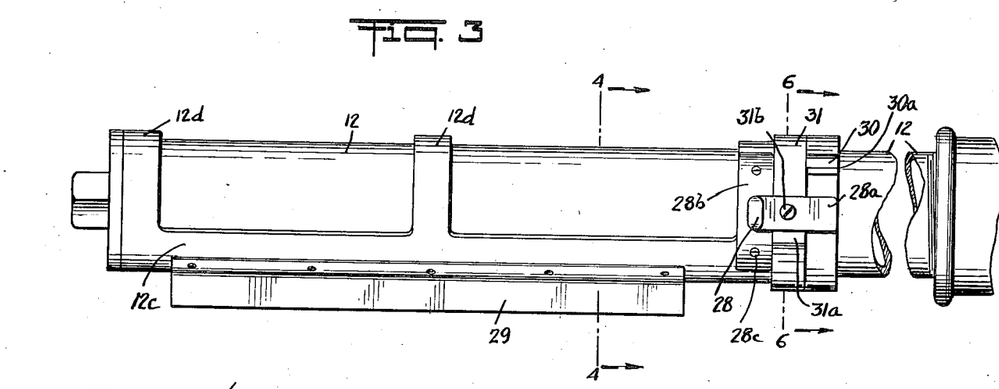
Fig. 3 is a detail elevation of the mechanism for controlling the flow of the coating material.

In order to lessen the weight of the control casing 12c, it is made with recesses, in order to provide a plurality of arms 12d, which are shown in Fig. 3. Said casing 12c is also provided adjacent the handle 28, as shown in Fig. 5, with an additional arm 12e, which is identical with the arms 12d.

The rigid handle 28 is L-shaped, so that said handle is provided with a rigid lug 28a, which is parallel to the longitudinal axis of the pipe 12. Said lug 28a is integral with or it is fixed to a segment 28b, which is shown in Figs. 3–5. This segment 28b is fixed to the arm 12e of the control casing 12c. Hence, the radially projecting handle 28 is turned in unison with the control casing 12c, about the longitudinal horizontal axis of the fixed pipe 12. The segment 28b is fixed to the arm 12e, by means of screws 28c.

Respective stop collars 31 and 30 are turnably mounted on the pipe 12. The stop collar 31 is provided with a stop 31a, and the stop collar 30 is provided with a stop 30a. These collars 31 and 30 can be releasably fixed to the pipe 12, by clamping screws or the like, in order to provide a predetermined angular spacing between the respective stops 30a and 31a. The lug 28a is located intermediate said stops 30a and 31a, in order to regulate the angle of the turning movement of the control casing 12c, relative to the pipe 12. A clamping screw 31b extends through a tapped bore of the rigid lug 28a. When the handle 28 has been set to the desired adjusted position, the clamping screw 31b is turned in order to clamp the lug 28a against the collar 31, which is fixed to the pipe 12. Hence, the control casing 12c and its spout 29 can be fixed in adjusted angular position relative to the pipe 12.

Figure 2:
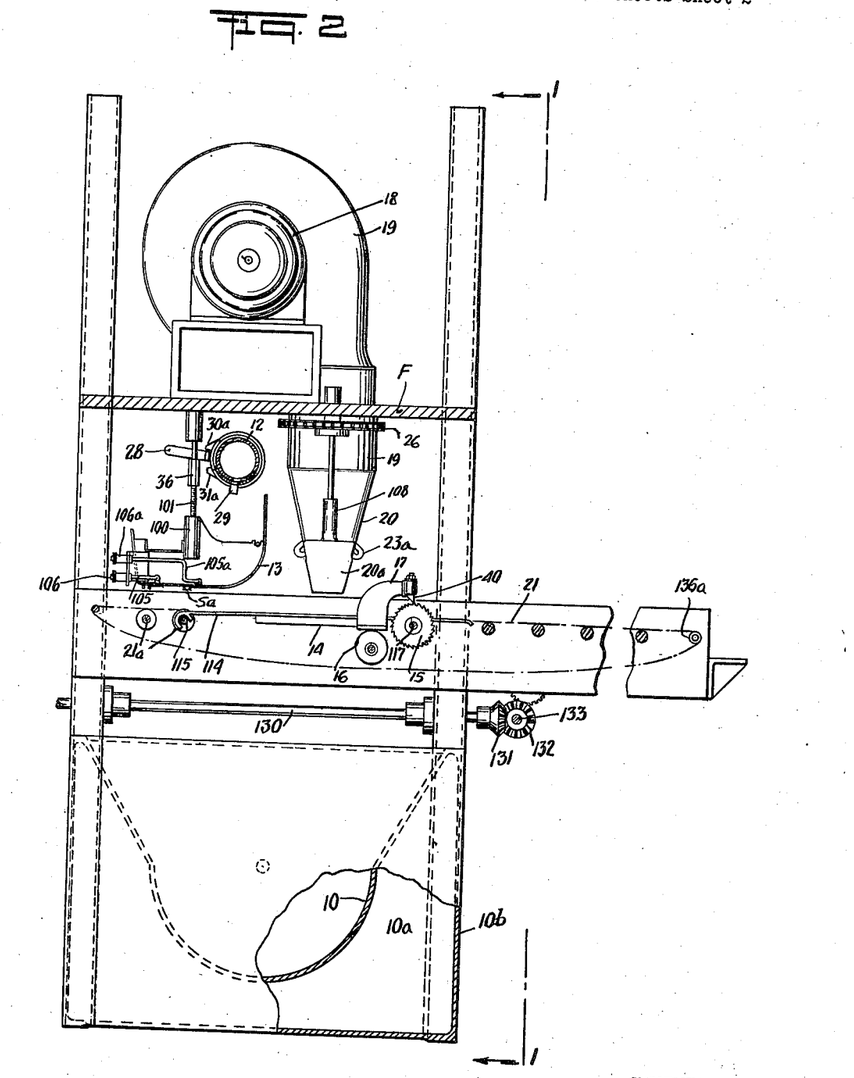
Fig. 2 is a sectional view on the line 2—2 of Fig. 1.

Fig. 2 shows a pan 13, to which the molten chocolate is delivered by the spout 29. This pan 13 is adjustably fixed to the stationary frame F of the machine.

Figure 10:
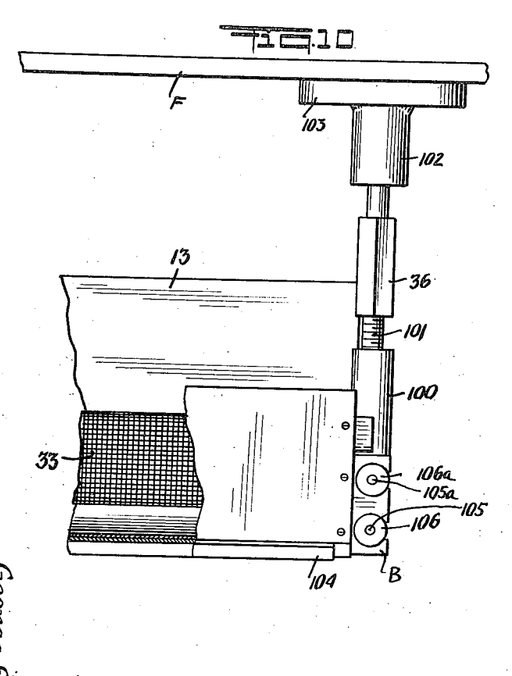
Fig. 10 is an enlarged detail view which shows the magazine pan from which the coating material is delivered to the pieces of candy or other products.
Figure 11:
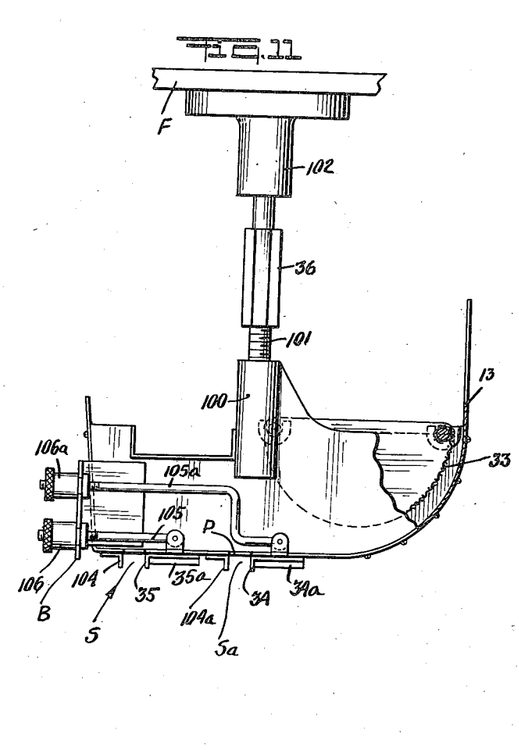
Fig. 11 is a side elevation of Fig. 10.

For this purpose, and as shown in Figs. 10 and 11, the pan 13 is provided with a pair of alined hubs 100. Each said hub 100 is tapped, in order to provide a vertical recess whose wall is threaded. The threaded end of a respective vertical rod 101 engages an internal thread of each respective hub 100. Each vertical rod 101 has a head 102 which is turnably mounted in a suitable bearing 103, which is fixed to the frame F. This bearing 103 is of the familiar type, which permits the rod 101 to turn around its vertical axis, without moving laterally or up or down. Each rod 101 has an enlargement 36 of polygonal cross-section. Therefore, by turning the rods 101 by means of their enlargements 36, the height of the pan 13 can be adjusted. This pan 13 is provided with the usual strainer 33.

The bottom wall of the pan 13 is provided with ports P which are alined with respective spouts S and Sa, whose respective widths can be adjusted. The spout S is provided with a fixed wall 104, which is fixed to the pan 13. The spout Sa is provided with a corresponding fixed wall 104a. The spout S has an adjustable wall 35 which can be moved towards and away from the respective fixed wall 104. The spout Sa has a corresponding adjustable wall 34. The respective movable walls 35 and 34 are angular, so that said movable walls can be moved to close the respective outlet ports P which are provided in the bottom wall of the pan 13. The movable wall 35 is fixed to a slide 35a, which is suitably guided upon the bottom horizontal wall of the pan 13. The adjustable wall 34 is fixed to a corresponding slide 34a.

A link 105 is provided externally to the pan 13, at each end of said pan. Each link 105 is pivotally connected to an upstanding lug of the slide 35a. Each link 105 has a threaded end which is located in the tapped bore of a sleeve 106. The sleeves 106 are turnably mounted in suitable bearings B which are provided at the ends of the pan 13. The sleeves 106 can turn in said bearings B, without moving in the direction of the parallel longitudinal axes of said sleeves 106. Hence, the position of the movable wall 35 relative to the fixed wall 104 can be adjusted by turning the sleeves 106. The sleeves 106a correspond to the sleeves 106, and the bent links 105a correspond to the links 105, so that the width of the spout Sa is regulated by turning the sleeves 106a.

Fig. 2 shows the usual endless enrober belt 21 which is made of wire mesh or other suitable perforate material. The top run of said enrober belt 21 is horizontal. Said enrober belt 21 is supported upon and guided by a series of rolls, some of which are shown in Fig. 2. The details of this enrober belt and of the mechanism for supporting and guiding the same are conventional per se.

Conventional undercoating rolls 21a are located under the respective spouts S and Sa. These undercoating rolls 21a abut parts of the horizontal top run of the enrober belt 21. Some of the coating material will be deposited upon these undercoating rolls 21a from the spouts S and Sa, so that said rotating undercoating rolls 21a will deposit the chocolate upon the undersides of the candies or other articles, thus forming complete coatings upon the candies or other articles. The candies or other articles are arranged in lateral rows on the top run of the enrober belt 21, so that each lateral row is first alined with the spout S and then with the spout Sa.

Each undercoating roll 21a extends laterally across the entire width of the top run of the enrober belt 21. In order to illustrate the parts clearly, these undercoating rolls 21a are shown in Fig. 2, as being substantially spaced longitudinally from each other. In the well-known construction, which I can use, said successive undercoating rolls 21a are much closer to each other, and they may almost abut each other, with slight longitudinal clearance. In such case, the spouts S and Sa are also located longitudinally close to each other, each spout S and Sa being vertically alined with the top of the respective undercoating roll 21a. The undercoating rolls 21a receive a supply of coating material from the spouts S and Sa. Any coating material which drips off said undercoating rolls 21a falls directly into tank 10, as the parts underneath the undercoating rolls 21a clear said undercoating rolls. It is conventional to make said undercoating rolls 21a identical, and to drive them in the same direction at equal velocity, so that the tops of the peripheries of said undercoating rolls 21a move in the same direction as the top run of the enrober belt 21. In Fig. 2, the top run of the enrober belt 21 is moved from left to right, and each undercoating roll 21a is therefore revolved clockwise at identical speed. It is conventional to turn said undercoating rolls 21a, so that their top portions which abut the top run of the enrober belt 21, move at greater linear velocity than the linear velocity of said top run. I utilize this conventional feature of the well-known enrober. Since the peripheral speed of the undercoating rolls exceeds the speed of the perforate top run of the enrober belt, said undercoating rolls 21a force the coating material thereon, upwardly through the interstices of the perforate enrober belt 21, according to standard practice.

On the average, the molten chocolate is deposited upon the articles while they are respectively underneath the spouts S and Sa, at a temperature of 90° F.

The machine removes surplus coating material from the objects while they are located on the top run of the enrober belt 21, before the coating material has substantially cooled or solidified, preferably in two or more successive blowing operations. If the coating material is the usual chocolate coating material, surplus coating material is blown off while said coating material is at a temperature of 90° F.

The coating-removing jet or jets of air are delivered through a nozzle 20, which has an extension 20a. The extension 20a delivers one or more jets of air at a temperature of about 85° F. Therefore, the air exerts little or no cooling effect upon the molten chocolate. The temperature of the air can be adjusted, so that it will exert no cooling effect upon the molten chocolate. While it is possible to adjust the machine so as to deliver only one jet of air, it is one of the great advantages of my machine to deliver at least two successive jets of air, which preferably operate successively in separate blowing operations. The surplus chocolate which is blown off the pieces of candy or the like by means of the jet or jets of air which are delivered to the extension 20a, is blown through the perforate top and bottom runs of the enrober belt 21, back into the tank 10. The outlet or outlets of the extension 20a are located as close as possible to the tops of the pieces of candy or the like, sufficient clearance being provided to prevent the pieces of candy or the like from contacting with the extension 20a.

Figures 7, 8:
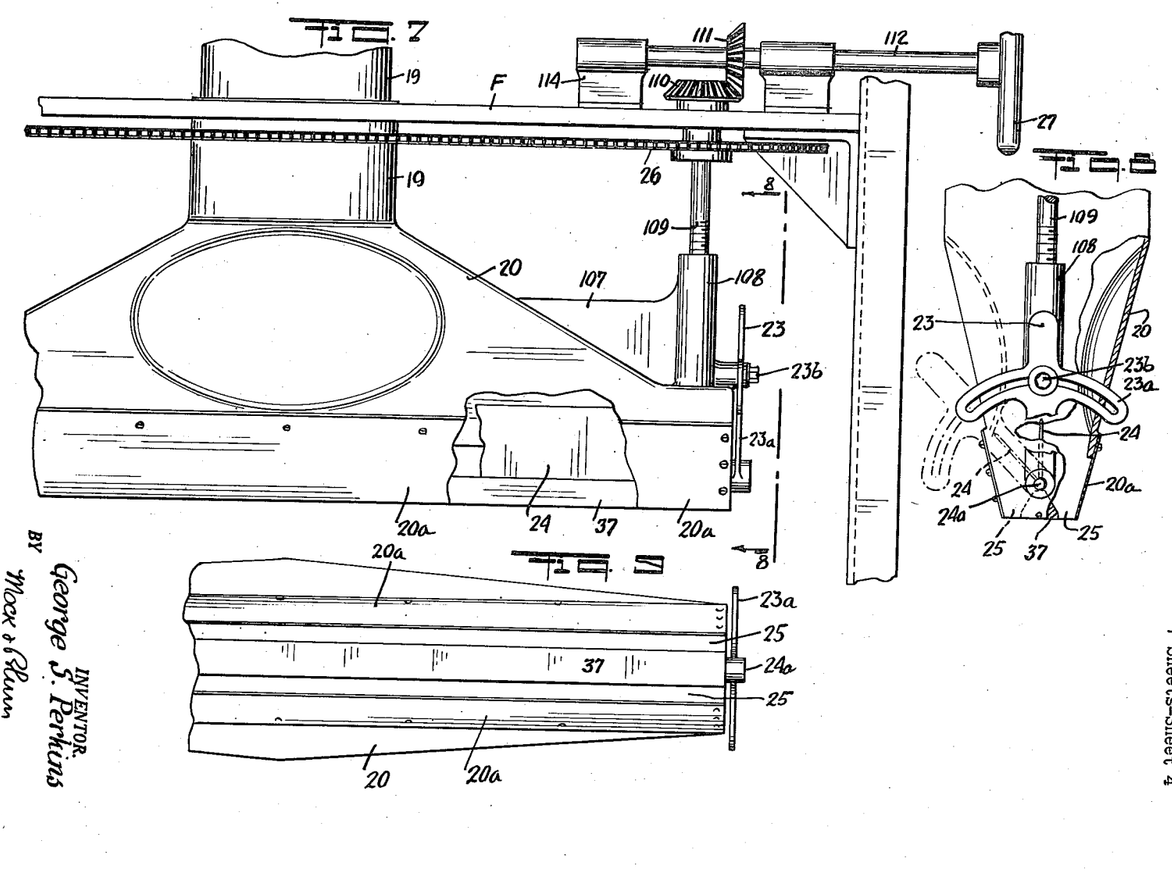
Fig. 7 is an enlarged detail elevation, showing the means for delivering air at suitable velocity, in order to remove surplus chocolate or other coating material.
Fig. 8 is an end view on the line 8—8 of Fig. 7.

The nozzle 20 is therefore vertically adjustable relative to the frame of the machine, so that the machine can coat pieces of different heights. As shown in Fig. 7, the nozzle 20 is of flared shape. The pipe 19 is telescopic at its lower end portion, so that the lower section of the pipe 19 can be moved up and down relative to the fixed upper portion of said pipe 19.

Fig. 7 shows that the nozzle 20 is provided with integral webs 107, which are provided with integral hubs 108. These hubs 108 are tapped in order to provide vertical bores which have threaded walls. Each hub 108 is associated with a rod 109, which has a lower threaded end, which is located in the tapped bore of the respective hub 108. Each rod 109 is provided with a suitable bearing in the frame F, so that each rod 109 can turn around its vertical axis, without moving laterally or up or down. The upper end of one of the rods 109 is provided with a bevel gear 110. This bevel gear 110 meshes with a bevel gear 111 on a shaft 112 which is turnably mounted in bearings 114 which are fixed to the frame F of the machine. The shaft 112 is turned by means of a hand wheel 27.

As shown for example in Fig. 1, the rods 109 are provided with respective sprockets which are connected by an endless horizontal chain 26, so that the rods 109 are simultaneously and equally turned, and the hubs 108 are equally and simultaneously moved up and down.

As shown for example in Fig. 8, extension 20a is provided with a partition vane 24. This vane 24 can be adjusted so that equal streams of air are delivered from the mouth of the extension 20a, or said streams can have any desired relative proportion of volume and/or velocity or either one of said streams may be shut off. This vane 24 is fixed at its lower end to pivots 24a which are turnably mounted in suitable bearings which are provided in the walls of the extension 20a.

The shaft 115 and the respective undercoating rolls 21a are positively driven.

The undercoating roll 21a which is at the left of Fig. 2, is fixed to a shaft which is geared or otherwise connected to shaft 115. This detail is conventional and it is not shown. The respective identical undercoating rolls 21a are therefore positively driven at identical velocity.

The lower end of extension 20a is provided with a baffle 37 which extends completely across the mouth of extension 20a, in a lateral direction which is perpendicular to the line of movement of the top run of the enrober belt 21. Hence baffle 37 divides the mouth of extension 20a into two wholly separate ports 25. The pivots 24a turn around an axis which is substantially coincident with the top wall of baffle 37, which has the tapered shape shown in Fig. 8. Hence the bottom edge of vane 24 always abuts or always substantially abuts the top walls of baffle 37. The vane 34 extends laterally completely across the extension 20a and the respective part of nozzle 20, thus dividing the respective part of nozzle 20 and the extension 20a, into two wholly separate chambers. A handle 23 is fixed to one of the pivots 24, externally to extension 20a. Handle 23 has a slotted extension 23a, whose slot is concentric with the axis around which handle 23 is turned. The shank of a clamping screw 23b extends through said slot. Said shank is located in a tapped bore of the respective adjacent hub 108. When clamping screw 23b is tightened, it clamps handle 23 and vane 24, in the desired adjusted position. When vane 24 and handle 23 are vertical, equal streams of air issue at equal velocity from the respective longitudinally spaced ports 25.

The width of baffle 37 can be selected so that if two jets of air are used, said jets strike the piece of candy successively, so that the first jet does not strike the piece of candy when the second jet strikes the piece of candy. If desired, the second jet of air can strike the piece of candy while the first jet of air is impinging upon the same piece of candy. Since the pieces of candy are arranged in lateral straight-line rows, this depends upon the size of the candies, and the longitudinal spacing between successive lateral rows. These rows are preferably equally longitudinally spaced. The candies of each said lateral row are simultaneously coated and said candies of each lateral row are also simultaneously subjected to the respective jets of air. The candies may be of different widths and heights. The machine is therefore adjusted to the particular height and width of the pieces which are being processed in the respective run of the machine. I prefer first to blow off the major part or nearly all of the surplus coating by the first jet of air, before the second jet becomes operative, and to have the second jet act as precision means, to blow off the relatively small remaining surplus portion of the surplus coating material. Hence, I prefer that each lateral row of candies should be moved beyond the effective zone of the first jet, before the candies enter the effective zone of the second jet, so that there is a short interval between the successive blowing operations on each candy. However, the invention is not limited to a time interval between the two blowing operations on each piece, because the second jet can operate on its respective part of the piece of candy, while a part of said piece is still in the effective zone of the first jet.

When the vane 24 is in the broken-line position shown in Fig. 8, one of the ports 25 is wholly closed. Hence, the vane 24 can be located so as completely to close either one of the ports 25, as well as to regulate the respective volumes and velocities of the respective jets of air.

After surplus coating material has been blown off the pieces of candy or the like, the remaining coating material which adheres to the pieces of candy or the like, has an irregular or wavy shape.

This wavy or irregular shape is eliminated, in order to provide smooth surface coatings, by immediately shaking the coated pieces before the coating has set, and preferably before the coating has substantially cooled.

The longitudinal edge portions of the top run of the enrober belt 21 are supported on respective rigid and longitudinal rails 14. These rails are angular in cross-section, so that they have top flanges 14a. The respective parts of the longitudinal edge portions of the top run of the enrober belt 21 rest upon the flanges 14a. Each rail 14 is fixed to an arm 114, which is rockably supported upon the shaft 115, which can be turned freely relative to each respective arm 114. The longitudinal rails 14 have cross rails 116 fixed thereto. Spaced longitudinal supporting members 39 are releasably fixed to the cross rails 116. Between its longitudinal edges, the top run of the enrober belt 21 is supported upon the laterally spaced longitudinal members 39, above the cross rails 116. The members 39 may be thin wires which are rigid. These members 39 can be vertically adjusted relative to cross rails 116.

The lateral shaft 117 is turnably mounted in suitable bearings which are fixed to the frame F of the machine. Ratchets or ratchet wheels 15 are fixed to the lateral shaft 117.

The shaft 117 is continuously rotated in the same direction, together with the ratchets or ratchet wheels 15, by means of a drive chain 118, which is continuously driven in any suitable manner.

Figure 12:
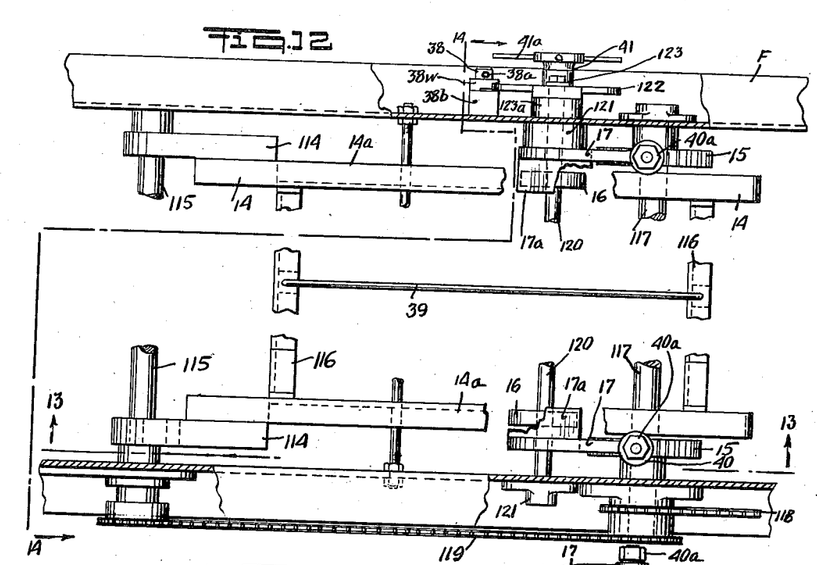
Figure 13:
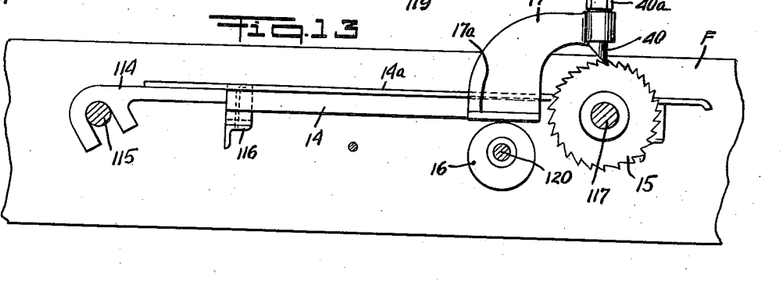
Fig. 13 is a sectional view on the line 13—13 of Fig. 12.
Figure 14:
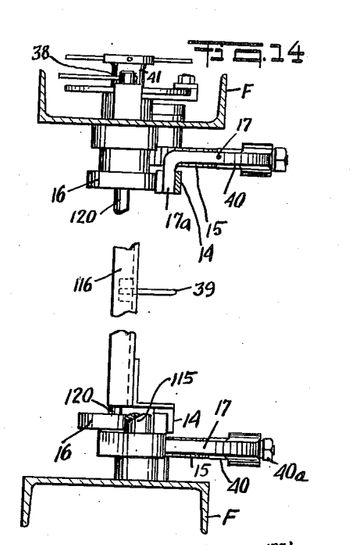
Fig. 14 is a sectional view on the line 14—14 of Fig. 12.
Figure 15:
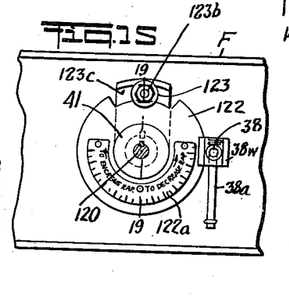
Fig. 15 is a section on the line 15—15 of Fig. 19, illustrating the rapping or shaking mechanism.
Figure 17:
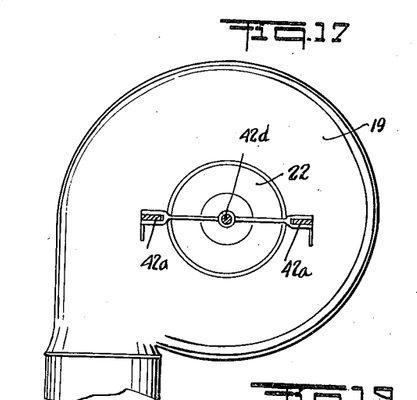
Fig. 17 is a sectional view on the line 17—17 of Fig. 16.

As shown in Fig. 12, the shafts 115 and 117 are connected by means of sprockets and an endless chain 119, but the shaft 115 is rotated by shaft 117 without oscillating the rapping frame which consists of the rails 14 and 116.

A vertical extension 17 is located adjacent each longitudinal rail 14. Each vertical extension 17 has an integral horizontal flange 17a. Each flange 17a is located in and fixed to a respective rail 14. Each vertical extension 17 is provided with a socket in which a pawl 40 is vertically adjustably fixed by means of a lock nut 40a. When the shaft 117 is rotated, the respective ratchet wheels 15 and the respective pawls 40 rapidly oscillate the rapping frame about the axis of the shaft 115.

The rails 14 and the longitudinal wires or members 39 always contact with the top run of the enrober belt 21, because this top run has enough sag to maintain this continuous contact. Hence, the part of the top run of the flexible enrober belt 21 which is above the rapping frame, is continuously and rapidly moved up and down, thus vigorously shaking the coated pieces, which also move in unison with said top run, and without separating the coated pieces from said top run. The amplitude of oscillation of the rapping frame is very small, and the coated pieces adhere somewhat to the enrober belt, due to the coating material.

The amplitude of this shaking or rapping movement is controlled by the adjustment of the cams 16 which contact with the undersides of the rails 14. These cams 16 can be rotated, in order to adjust them, by means of a shaft 120. The cams 16 are held stationary, save when shaft 120 is turned to adjust the effective heights of said cams. The cams 16 can be adjusted so that the pawls 40 are held wholly out of contact with the teeth of the ratchet wheels 15, or said pawls 40 are held in any desired vertical relation to said teeth, in order to control the amplitude of the vibration of the rapping frame and of the respective part of the top run of the enrober belt 21. This is much superior to the old method of adjusting the pawls 40 individually, relative to the oscillating rapping frame.

In addition to simultaneously and equally adjusting both cams 16 by turning shaft 120, one of said cams 16 can be turned on shaft 120, for an additional adjustment.

Figure 19:
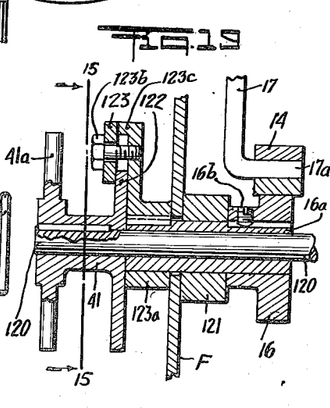
Fig. 19 is a section on the line 19—19 of Fig. 15.

As shown in Fig. 19, one of the cams 16 is releasably fixed to a sleeve 16a by means of a clamping screw 16b. The cam 16 which is thus fixed to sleeve 16a is the cam 16 which is shown at the top of Fig. 12. This cam 16 has a hub, as shown in Fig. 19, in which the clamping screw 16b is located. Said sleeve 16a extends through the respective frame member.

A collar 123a is caused to turn in unison with sleeve 16a, as by means of a key or the like. Collar 123a has a radial arm 123c. A dial 122 is clamped to said radial arm 123c by means of a clamping washer 123 and a clamping screw 123b. Said dial 122 has a hub 41 which is keyed to shaft 120, so that dial 122 and shaft 120 are turned in unison.

The dial 122 is provided with a scale 122a. The dial 122 can be clamped to the stud 38b which is fixed to the adjacent frame member by a clamping washer 38w and a clamping screw 38. A handle 38a is located slidably in the head of screw 38, in order to turn said screw 38.

It is the object of the invention to have both cams 16 located identically on the shaft 120, so that said cams 16 have their radii of maximum length simultaneously vertical. These cams 16 thus operate simultaneously and equally on the respective rails 14, so that said rails 14 are simultaneously and equally rocked up and down.

In order to adjust the cam 16 which is shown in Fig. 19, relative to shaft 120, so that both cams 16 are thus located identically on shaft 120, the clamping screw 123b is loosened, without loosening the clamping washer 38w. The arm 123c is then turned, thus turning sleeve 16a on shaft 120 in unison with the respective cam 16, until said cam 16 is in identical relation with the other cam 16.

After both cams 16 are thus in identical relation on shaft 120, the clamping washer 123 is tightened by screw 123b, thus fixing dial 122 to sleeve 123a. The scale 122a is used in connection with a suitable fixed index, such as a pointer on the clamp 38w, to designate the direction and the angle of adjustment.

After dial 122 has thus been clamped to sleeve 123a, it may be necessary to rotate the shaft 120 in unison with both cams 16, in order to regulate the amplitude of the rapping movement.

This is done by loosening screw 38 and clamping washer 38w. The sleeve 41 can now be turned by its handle 41a, in unison with shaft 120, thus simultaneously and equally adjusting both cams 16, while said cams 16 are fixed in identical relation to shaft 120.

After the coatings have been made smooth by the rapping operation, the coated articles are passed off the top run of the enrober chain 21, to the usual cooling tunnel, which is not shown.

Fig. 1 and Fig. 2 show the main drive shaft 133, whose bevel gear 132 meshes with a bevel gear 131 which is fixed to the shaft 130, which is thus positively driven. Gear 134 is fixed to the main drive shaft 133. Gear 134 meshes with a gear 135 which is rotatable on a pin which is fixed to one of the rolls on which the enrober chain is mounted, so that shaft 136a drives the enrober chain 21.

The drive chain 118 which is shown in Fig. 12 is connected in any suitable manner to a roll which meshes with and is actuated by the enrober chain 21.

Fig. 1 shows the motor 18 for actuating the blower which forces air through the pipe 19 into the nozzle 20.

Figure 18:
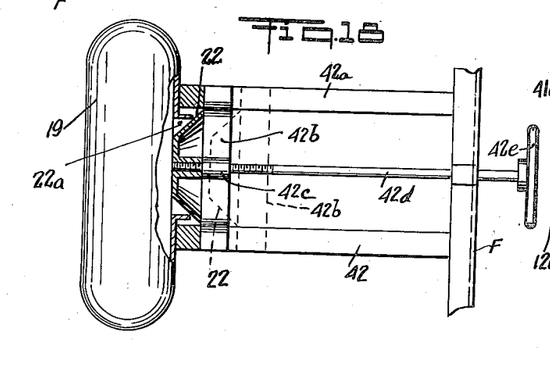
Fig. 18 is a top plan view, partially in section, of the air inlet control.

As shown in Fig. 18, the pipe 19 is provided with an inlet port 22a. The frusto-conical valve 22 is adjustable, in order to regulate the amount of air which is admitted into the pipe 19. This valve 22 always produces a uniform distribution of the air which enters the pipe 19. The frusto-conical valve 22 is fixed to a slide 42b which is mounted slidably on rails 42a which are fixed to the pipe 19. Hence, the valve 22 and the slide 42b are moved in unison. Slide 42b has a tapped hub 42c whose internal thread engages with the external thread of a shaft 42d which has a hand wheel 42e. The shaft 42d is turnably mounted in the frame F, and its bearing prevents said shaft 42d from moving longitudinally.

As previously stated, the baffle 37 extends transversely across the entire mouth of extension 20a, so that if the vane 24 is vertical, two equal and longitudinal spaced blasts of air impinge successively upon each coated piece. I have found that in order to regulate the removal of surplus coating, it is highly advantageous to use two or more separate blasts of air, which are spaced longitudinally along the path of movement of the candies, so that said blasts act successively. By regulating said respective blasts, I produce more sensitive and accurate removal of surplus coating.

Ordinarily, the first or anterior blast, which is closest to the nozzle Sa, should be the most powerful. The regulation of the blasts makes it possible to regulate the removal of surplus coating material from candies of different sizes, such as large chocolate drops and small chocolate drops. At one time, the machine may be operating on large candies, and at another time on small candies. The thickness of the coating on the undersides of the candies is regulated by the thickness of the wire enrober belt. Hence, the blasts of air remove surplus coating material only from the tops and sides of the candies.

The spouts S and Sa can be located longitudinally very close to each other, in the conventional manner, and the undercoating rolls 21a can also be thus located very close to each other, so that little or no coating material will drip down from the adjacent positions of said rolls. Any such material which drips down, is returned to tank 10.

The undercoating rolls 21a force the coating material upwardly through the perforations or interstices of the perforate enrober belt.

I claim:

1. In a candy coating machine of the class which has a fixed frame and a rapping frame which is mounted to oscillate up-and-down relative to said fixed frame around a selected horizontal axis, and driven toothed means for oscillating said rapping frame, said rapping frame having pawl means which are located to intermesh with said toothed means so that the actuation of said toothed means oscillates said rapping frame, the improvement which consists of adjusting mechanism which is adjustably fixed to said fixed frame, said adjusting mechanism being constructed and operative to regulate the extent of intermeshing of said pawl means with said toothed means in order to adjust the amplitude of oscillation of said rapping frame, said adjusting mechanism being fixed to said fixed frame during said oscillation of said rapping frame.

2. In a candy coating machine of the class which has a fixed frame and a rapping frame which is mounted to oscillate up-and-down relative to said fixed frame around a selected horizontal axis, and driven toothed means for oscillating said rapping frame, said rapping frame having pawl means which are located to intermesh with said toothed means so that the actuation of said toothed means oscillates said rapping frame, the improvement which consists in providing a horizontal shaft which is adjustably and turnably mounted in said fixed frame below said rapping frame, said shaft having a pair of cams connected thereto, said cams being located to abut said rapping frame at the bottom of the downward movement of said rapping frame, one of said cams being fixed to a sleeve which is turnable on said shaft to bring said cams into identical respective relation relative to said rapping frame, a collar turnable in unison with said shaft, and releasable clamping means adapted to clamp said collar to said sleeve.

3. In a candy coating machine of the class which has a fixed frame and a rapping frame which is mounted to oscillate up-and-down relative to said fixed frame around a selected horizontal axis, and driven toothed means for oscillating said rapping frame, said rapping frame having pawl means which are located to intermesh with said toothed means so that the actuation of said toothed means oscillates said rapping frame, the improvement which consists in providing a horizontal shaft which is adjustably and turnably mounted in said fixed frame below said rapping frame, said shaft having a pair of cams connected thereto, said cams being located to abut said rapping frame at the bottom of the downward movement of said rapping frame, one of said cams being fixed to a sleeve which is turnable on said shaft to bring said cams into identical respective relation relative to said rapping frame, a collar turnable in unison with said shaft, and releasable clamping means adapted to clamp said collar to said sleeve and additional clamping means to clamp said collar to said fixed frame.

4. In a candy coating machine of the class which has a fixed frame and a rapping frame which is mounted to oscillate up-and-down relative to said fixed frame around a selected horizontal axis, and driven toothed means for oscillating said rapping frame, said rapping frame having pawl means which are located to intermesh with said toothed means so that the actuation of said toothed means oscillates said rapping frame, the improvement which consists in providing a horizontal shaft which is adjustably and turnably mounted in said fixed frame below said rapping frame, said shaft having a pair of cams connected thereto, said cams being located to abut said rapping frame at the bottom of the downward movement of said rapping frame, one of said cams being fixed to a sleeve which is turnable on said shaft to bring said cams into identical respective relation relative to said rapping frame, a collar turnable in unison with said shaft, and releasable clamping means adapted to clamp said collar to said sleeve and additional clamping means to clamp said collar to said fixed frame, said releasable clamping means operating on a dial extension of said sleeve, said dial extension having a scale, said additional clamping means also operating on said dial extension.

GEORGE SIMPSON PERKINS.

REFERENCES CITED

The following references are of record in the file of this patent:

UNITED STATES PATENTS

| Number | Name | Date |
| --- | --- | --- |
| Re. 10,979 | Juwell | Jan. 8, 1889 |
| 1,043,513 | Dell | Nov. 5, 1912 |
| 1,611,576 | Bausman | Dec. 21, 1926 |
| 1,759,355 | Kampman | May 20, 1930 |
| 2,033,781 | Newman | Mar. 10, 1936 |